(12) United States Patent
Morlacchi

(10) Patent No.: US 6,855,171 B2  
(45) Date of Patent: Feb. 15, 2005

(54) PROCESS FOR WATERPROOFING LEATHER AND LEATHER OBTAINED BY MEANS OF SAID PROCESS

(75) Inventor: Antonio Morlacchi, Legnano MI (IT)

(73) Assignee: Nextec S.r.l., Parabiago MI (IT)

(*) Notice: Subject to any disclaimer, the term of this patent is extended or adjusted under 35 U.S.C. 154(b) by 373 days.

(21) Appl. No.: 09/838,035

(22) Filed: Apr. 19, 2001

(65) Prior Publication Data

US 2001/0023023 A1 Sep. 20, 2001

Related U.S. Application Data

(63) Continuation of application No. PCT/IT99/00333, filed on Oct. 20, 1999.

(30) Foreign Application Priority Data

Oct. 20, 1998 (IT) ........................................ MI98A2247

(51) Int. Cl.⁷ .............................................. A61L 17/00
(52) U.S. Cl. ...................... 8/94.1 R; 8/94.15; 428/336; 428/411.1
(58) Field of Search .............................. 8/94.1 R, 94.15; 428/336, 411.1

(56) References Cited

U.S. PATENT DOCUMENTS

| 4,925,732 A | * | 5/1990 | Driskill et al. ............... 428/336 |
| 5,283,112 A | * | 2/1994 | Krishnan ..................... 428/261 |
| 5,598,644 A | | 2/1997 | Polegato |

FOREIGN PATENT DOCUMENTS

| EP | 0 380 902 A2 | 8/1990 |
| GB | 2 209 705 A | 5/1989 |
| GB | 2 290 455 A | 1/1996 |

* cited by examiner

Primary Examiner—Yogendra N. Gupta  
Assistant Examiner—D. G. Hamlin  
(74) Attorney, Agent, or Firm—Akin Gump Strauss Hauer & Feld, LLP

(57) ABSTRACT

A process for waterproofing leather (1) includes pressing on the internal surface of the leather (1) at least one semi-permeable membrane (2) whose surface contacting the leather (1) is provided with a glue pattern. The glue pattern of the semi-permeable membrane (2) is preferably thermoadhesive, and therefore the pressing of the membrane on the leather (1) is preferably a hot pressing. Further, the semi-permeable membrane (2) is preferably elastic, non-porous and combined with a support sheet (3). The leather obtained by the process is also provided.

15 Claims, 1 Drawing Sheet

PROCESS FOR WATERPROOFING LEATHER AND LEATHER OBTAINED BY MEANS OF SAID PROCESS

CROSS-REFERENCE TO REATED APPLICATION

This application is a Continuation of International Application PCT/IT99/00333, filed Oct. 20, 1999, the disclosure of which is incorporated herein by reference.

BACKGROUND OF THE INVENTION

The present invention relates to a process for waterproofing leather, particularly leather for the manufacture of shoes, clothes or leather accessories. The present invention also relates to the leather obtained by said process.

Leathers, particularly those which are used for the manufacture of shoes, clothes or leather accessories, are known to be waterproofed by chemical treatments consisting in applying thin layers of water-repellent substances outside the leather itself, for example by means of sprayers. Because of the low efficiency of this process in the long term, a new process has been conceived, consisting in sewing inside the leather a fabric lining combined with a semi-permeable film, which not only prevents water from further penetrating into the shoe or dress article, but also allows the body outward transpiration.

However, this process is disadvantageous in that it allows water to penetrate anyway under the leather, and therefore, especially if the latter is used for the shoe-manufacture, an undesired water-cushion is formed between the waterproofing fabric and the leather internal surface. Further, this process necessarily requires the application of a lining combined with a semi-permeable film, which, besides increasing the production costs, is in some cases inadvisable, for example in the manufacture of summer shoes and clothes. U.S. Pat. No. 5,598,644 discloses a process for waterproofing a tread of leather, wherein a semi-permeable membrane is glued to the perimetric regions thereof. However, this process does not avoid the formation of water-cushions and the need of an upper perimetric part for fastening the membrane to the tread, thus reducing its transpiration properties.

BRIEF SUMMARY OF THE INVENTION

An object of the present invention is therefore to provide a waterproofing process free from said disadvantages, that is, a process allowing leathers to be made waterproof without preventing the body transpiration and avoiding the use of the above mentioned semi-permeable internal linings or fastening parts. Said object is obtained by means of a process, the main features of which are disclosed in the first claim. Other features of the process and of the products obtained by means of said process are disclosed in the subsequent claims.

Thanks to the use of a semi-permeable membrane having one surface provided with an glue pattern, the process according to the present invention allows said membrane to be applied directly to the leather which has to be waterproofed, so as to avoid the use of a semipermeable lining and the water penetration between leather and lining.

Further, because of its discontinuous structure, the glue layer plugs only part of the leather pores, thus allowing water vapor to pass outwards with resulting preservation of the user's comfort.

Another advantage of the process according to the present invention consists in that it can be carried out in a simple and fast way, without complicated and expensive machines, and therefore it can be employed not only in the industrial manufacture but also in the hand-making, particularly of shoes.

Another advantage of the process according to the present invention consists in that it allows not only whole leathers, but also sheared or even semifinished leathers, for instance sewed with other leathers and/or punched, to be uniformly waterproofed without compromising the waterproofing grade.

During laboratory tests, every leather waterproofed by the process according to the present invention has proved to prevent water passage, even at considerable pressures, resulting for instance from a water column higher than 2 meters, and therefore the employment thereof is particularly recommended in the manufacture of shoe uppers and soles, when they are made in leather, which request a high water tightness and at the same time the possibility of transpiration for the foot.

BRIEF DESCRIPTION OF THE SEVERAL VIEWS OF THE DRAWINGS

Further advantages and features of the process according to the present invention will be clear to those which are skilled in the art from the following detailed description of one embodiment thereof with reference to the accompanying drawing, wherein the only FIGURE shows a piece of leather waterproofed by said process.

DESCRIPTION OF THE INVENTION

Figure 1:
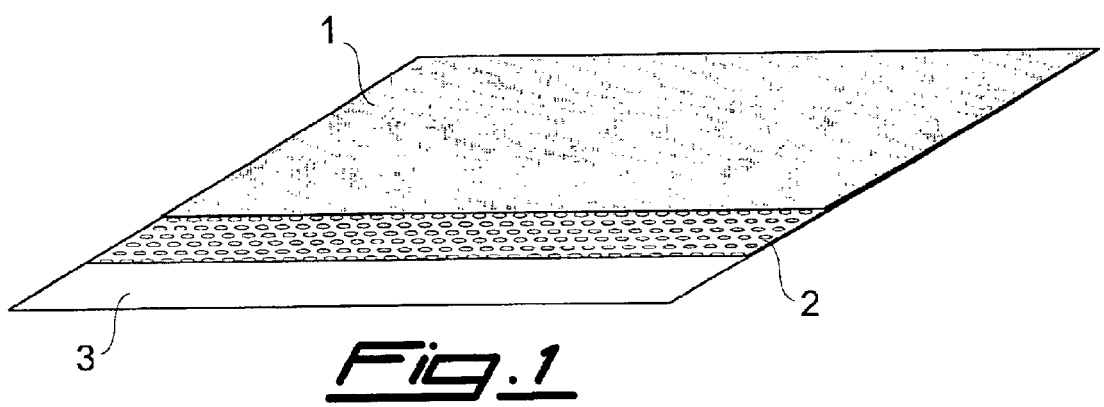

With reference to this FIGURE, said embodiment of the process consist in applying to a leather 1 at least one semi-permeable membrane 2 which covers completely the internal surface of said leather 1. This application is carried out by pressing, preferably hot-pressing, the whole of leather and membrane by means of a flat press or a roll press provided with a heating system. In fact, the surface of membrane 2 contacting leather 1 is provided with a pattern of thermoadhesive glue, which is preferably formed of a plurality of dots of polyurethane glue, having a diameter included between 0.1 mm and 0.8 mm and a density included between 50 dots/cm$^2$ and 200 dots/cm$^2$. By heating membrane 2 during pressing, a perfect adhesion to leather 1 is obtained, without the risk of plugging the pores thereof with the glue.

Membrane 2 suitably comprises a sheet of semi-permeable material, for instance made of polyurethane, polytetrafluoroethylene, polyester or other polymers, the thickness of which is preferably included between 5 $\mu$m and 100 $\mu$m. Particularly, membrane 2 according to the present embodiment of the invention is made of 100% polyurethane. Further, it is preferably elastic, with a coefficient of elongation higher than 50%, particularly 100%, and it is not porous, because it carries out the water vapor passage by osmosis, and therefore, differently form the porous membranes, the water passage is prevented even when it is pulled or bent.

The surface of the semi-permeable membrane 2 which is not provided with glue is generally fastened to a support sheet 3 which avoids possible accidental breakage or bendings before application. Said sheet 3 can be made of paper and can be detachable after that membrane 2 has been adhered to leather 1. In other embodiments of the present invention, support sheet 3 can be made of different materials, for example fabric, and be firmly fastened to membrane 2 if leather 1 is desired to be internally lined at the end of the processing.

In other embodiments of the process according to the present invention, leather 1 fastened to membrane 2 can be further processed, for instance shaped and sewed to other waterproofed leathers. In this case it is advisable applying to the sewings a sealing tape or a second piece of semi-permeable membrane 2, so that the leather waterproofing is not compromised.

In a practical test, a multiplicity of leather samples of the "full grain" kind, having a thickness of 1.2 mm, have been waterproofed by the process according to the present invention. The samples have been hot-pressed with a hydrophilic non-porous semi-permeable membrane of polyurethane material having a thickness of 10 µm. The membrane surface contacting the samples was provided with a pattern of polyurethane thermoadhesive glue formed of glue dots having a diameter of 0.2 mm and a density of 150 dots/cm². The application of the membrane to the samples has been carried out with a flat press, at a temperature of 120° C. and a pressure of 5 kg/cm², for a period of 10 seconds. As a result of this test, it was found that:

- according to the specification UNI 8245, even after 3 hours there was no water passage.
- water vapor permeability, according to specification IUP/15 of the Italian Society of Leather Technologists and Chemists (Società dei Tecnologi e Chimici del Cuoio), was higher than 1 mg/cm² per hour.
- resistance to a number of flexings, according to specification UNI 4818-13 or Bally method, was higher than 80,000 cycles;
- resistance to the detachment of the membrane from the sample, according to is specification UNI 4818-10, was 15 N/cm; and
- resistance to water-column, according to specifications UNI 5218 and ISO 811, was higher than 5 meters.

The latter high value of the resistance to a water column is a typical feature of the leathers waterproofed according to the process of the present invention, in fact this kind of tests is not included among those normally carried out on the leathers of shoe uppers. Furthermore, the results of the above described test are substantially the same for all the leather samples, this underlining waterproofing uniformity and homogeneity of the process, even in the case of two pieces of leather sewed together.

It will be appreciated by those skilled in the art that changes could be made to the embodiments described above without departing from the broad inventive concept thereof It is understood, therefore, that this invention is not limited to the particular embodiments disclosed, but it is intended to cover modifications within the spirit and scope of the present invention as defined by the appended claims.

I claim:

1. A process for waterproofing leather (1), comprising directly pressing on an internal surface of the leather (1) at least one semi-permeable membrane (2) whose surface contacting the leather (1) is provided with a discontinuous glue pattern to adhere the leather to the semi-permeable membrane, wherein the glue pattern is formed of a multiplicity of dots having a density included between 50 dots/cm² and 200 dots/cm².

2. The process according to claim 1, wherein the glue pattern of the semi-permeable membrane (2) is thermoadhesive, and the pressing of said membrane on the leather (1) is a hot-pressing.

3. The process according to claim 1, wherein the semi-permeable membrane (2) is not porous and carries out the water vapor passage by osmosis.

4. The process according to claim 1, wherein said semi-permeable membrane (2) is elastic with a grade of elongation higher than 50%.

5. The process according to claim 1, wherein said semi-permeable membrane (2) is made of polyurethane.

6. The process according to claim 1, wherein said semi-permeable membrane (2) has a thickness included between 5 µm and 100 µm.

7. The process according to claim 1, wherein said semi-permeable membrane (2) is combined with a support sheet (3).

8. The process according to claim 7, wherein the support sheet (3) is made of fabric and is firmly fastened to the membrane (2).

9. A process for waterproofing leather (1), comprising directly pressing on an internal surface of the leather (1) at least one semi-permeable membrane (2) whose surface contacting the leather (1) is provided with a discontinuous glue pattern to adhere the leather to the semi-permeable membrane, wherein the glue pattern is formed of a multiplicity of dots having a diameter included between 0.1 mm and 0.8 mm.

10. A leather (1) which is waterproofed by a process according to claim 1.

11. The leather according to claim 10, wherein it is made of two or more pieces sewed together.

12. A shoe comprising an upper of waterproofed leather according to claim 10.

13. A shoe comprising a sole of waterproofed leather according to claim 10.

14. The process according to claim 1, wherein the glue pattern provides adhesion between the membrane (2) and the leather (1) while avoiding plugging of pores of the leather.

15. The process according to claim 1, wherein no semi-permeable lining is used between the leather and the membrane.

* * * * *